United States Patent
Goto

(10) Patent No.: US 6,790,153 B2
(45) Date of Patent: Sep. 14, 2004

(54) ROLLER CLUTCH ASSEMBLY

(75) Inventor: Shiro Goto, Plymouth, MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/309,830

(22) Filed: Dec. 4, 2002

(65) Prior Publication Data

US 2004/0110594 A1 Jun. 10, 2004

(51) Int. Cl.[7] .............................................. F16H 48/30
(52) U.S. Cl. ...................... 475/150; 475/231; 475/237; 475/239; 192/38; 192/40; 192/52.2; 192/52.3; 192/107 R
(58) Field of Search ................................ 475/150, 231, 475/237, 239; 192/84.8, 38, 40, 35, 107 R, 52.2, 52.3

(56) References Cited

U.S. PATENT DOCUMENTS

| | | | |
|---|---|---|---|
| 3,753,477 A | * 8/1973 | Cadet | ........................ 192/41 A |
| 5,924,510 A | 7/1999 | Itoh et al. | |
| 5,927,456 A | 7/1999 | Monahan et al. | |
| 5,967,277 A | * 10/1999 | Walter | ........................ 192/43.1 |
| 6,481,548 B2 | * 11/2002 | Monahan et al. | ............. 192/38 |
| 6,550,594 B1 | * 4/2003 | Peura | ........................... 192/44 |
| 6,551,209 B2 | * 4/2003 | Cheadle et al. | |
| 6,595,337 B2 | * 7/2003 | Goto et al. | ................. 192/84.8 |

FOREIGN PATENT DOCUMENTS

DE          10139006 A1  *  4/2002  ........... F16D/41/08

* cited by examiner

Primary Examiner—Saul Rodriguez
Assistant Examiner—David D. Le
(74) Attorney, Agent, or Firm—Brinks Hofer Gilson & Lione

(57) ABSTRACT

An over-running clutch assembly comprises an outer race having a cylindrical inner surface and an inner race having a cammed outer surface coaxial with the cylindrical inner surface and defining a gap therebetween and a roller clutch disposed within the gap; a biasing element biases the roller clutch to a disengaged position; and an actuator selectively overcomes the biasing element to engage the roller clutch and lock the inner and outer races to prevent relative rotation therebetween. The actuation disk and the case end includes a first portion adapted to provide initial axial surface to surface contact between the actuation disk and the case end when the actuation disk contacts the case end and a second portion adapted to provide an surface to surface contact only after deflection of the actuation disk under the force of the actuator, thereby providing a spring back response when the actuator is de-energized.

25 Claims, 6 Drawing Sheets

ROLLER CLUTCH ASSEMBLY

TECHNICAL FIELD OF THE INVENTION

This invention is related to a two way over-running clutch, preferably for use in automotive differential or transfer case applications. More specifically, the present invention relates to a two-way over-running clutch assembly of a roller/ramp variety which can be controlled for selectively locking up an automotive differential assembly or transfer case, wherein the trigger clutch section includes an undercut portion adapted to allow more efficient disengagement of the clutch.

BACKGROUND OF THE INVENTION

Differential assemblies are used in motor vehicles to allow the wheels to turn at different rotational speeds while still providing power to the wheels. Various types of differential assemblies are used in motor vehicles to redirect the transfer of power to the driving axles.

In a standard open differential, as a vehicle turns, power continues to be provided through pinion and ring gears to the differential housing. As the inner and outer wheels trace circles of different radii, side gears attached to axle shafts are allowed to turn at different speeds by the motion of intermediate spider gears. As long as traction is maintained between the drive wheels and the road surface, the power is properly distributed to the wheels through the differential assembly. However, when traction is reduced or lost altogether at one or both wheels, a standard open differential assembly will spin uselessly, providing little tractive power to the wheels. For instance, if one tire is on ice or some other slippery surface while the other is on dry pavement, slip will occur at the low friction side and the torque applied to the non-slipping tire will be limited to the torque generated at the slipping tire. In such circumstances, very little power will be delivered to the wheel on the dry pavement and the vehicle will not be powered forward or backward. Therefore, there is a need to lock the axle halves together in certain situations.

A differential assembly design that is used to overcome the shortcomings of the standard differential assembly is known as the locking differential. A locking differential typically engages a "dog" clutch or an axial gear set to effectively lock the two axle halves together, or lock one of the side gears to the differential housing, so that the axles are forced to rotate at the same speed. Unfortunately, this type of locking differential cannot be engaged "on-the-fly", or when the vehicle is in motion, because any relative motion between the gear teeth would result in severe mechanical damage. It would be desirable to selectively lock the differential assembly instantaneously during "on-the-fly" operation.

It is known in the art to selectively lock other drivetrain components using roller/ramp clutch assemblies. For example, the two-way over-running clutch assembly described in U.S. Pat. No. 5,927,456, assigned to NTN Corporation, and hereby incorporated by reference, describes a clutch assembly of a roller ramp variety and the mechanism by which the rollers are retained and biased in the assembly. In addition, the rotation transmission device described in U.S. Pat. No. 5,924,510, also assigned to NTN Corporation, and hereby incorporated by reference, discloses a device which includes a clutch assembly mounted in the transfer case of a four-wheel drive vehicle that can selectively transmit a driving torque.

It would be desirable to provide this technology for use with differential assemblies to selectively lock the two axle halves together during "on-the-fly" operation. A primary object of this invention is therefore to provide a two-way over-running clutch mechanism, such as that disclosed in U.S. Pat. No. 5,927,456 or U.S. Pat. No. 5,924,510, installed in the differential assembly of a motor vehicle which when energized will lock together a side gear or drive axle and the differential housing so that no relative rotation can occur between the two drive wheels. This system will provide on-demand traction and can be controlled by an electromagnetic trigger clutch, by hydraulic or pneumatic actuators, or by other means.

Another object of the present invention is to provide a differential assembly which can be selectively locked together instantaneously during "on-the-fly" operation.

BRIEF SUMMARY OF THE INVENTION

In accordance with an aspect of the present invention an over-running clutch assembly comprises an outer race having a cylindrical inner surface and being rotatable about an axis and a case end enclosing a first end of the outer race, an inner race having a segmented (flat or slightly concave) outer surface coaxial with the cylindrical inner surface and defining a gap therebetween. The inner race is rotatable about the axis with rotational movement relative to the outer race. A plurality of ramp surfaces formed at spaced apart locations on the outer surface define a plurality of cammed surfaces on the outer surface of the inner race. A plurality of rollers are positioned between the outer race and the inner race with one of the rollers being located centrally within each of the cammed surfaces and each of the rollers having a diameter less than the gap between the center of the cammed surface on the inner race and the cylindrical inner surface of the outer race. A retainer interconnects all of the rollers and causes the rollers to circumferentially move in unison with one another. The retainer is rotatable about the axis with limited relative rotation with respect to the inner race. A first biasing element is supported on the retainer to radially bias the retainer position relative to the inner race such that each of the rollers is held in the center of the flat cammed surfaces on the inner race. An actuation disk is connected to the retainer by a means which allows some axial movement of the actuation disk with respect to the retainer toward the case end.

The preferred method would include a series of retainer tabs extending axially from one end of the retainer and notches which are adapted to engage the retainer tabs, thereby preventing circumferential or relative rotational motion of the actuation disk relative to the retainer and allowing axial motion of the actuation disk relative to the retainer. There are at least two, and preferably four, tabs extending outward to engage notches within the actuation disk. A second biasing element is disposed between the actuation disk and the inner axial surface of the case end to bias the actuation disk away from the case end.

The clutch assembly includes an actuator to selectively overcome the second biasing element to force the actuation disk into contact with the case end, wherein rotation of the outer race and case end with respect to said inner race is frictionally transferred to the actuation disk and the retainer, overcoming the first biasing element, thereby moving the rollers along the ramp surfaces to a position where the rollers engage and wedge between the inner and outer races to prevent relative rotation between the inner and outer races.

Further, either the actuation disk, or the axial inner surface of the case end includes an undercut region which initially reduces the amount of surface area contact between the actuation disk and the axial inner surface of the case end. After initial contact has been made between the actuation disk and the case end, the actuation disk will deflect, thereby allowing the undercut portions between the actuation disk and the case end to contact as well. When the actuator is de-activated, The deflected portions of the actuation disk will be biased to spring back away from the case end, thereby allowing the second biasing element to bias the actuation disk away from the axial inner surface of the case end with less resistance due to surface tension.

DETAILED DESCRIPTION OF THE INVENTION

The following description of the preferred embodiment of the invention is not intended to limit the scope of the invention to this preferred embodiment, but rather to enable any person skilled in the art to make and use the invention.

Figures 1, 3:
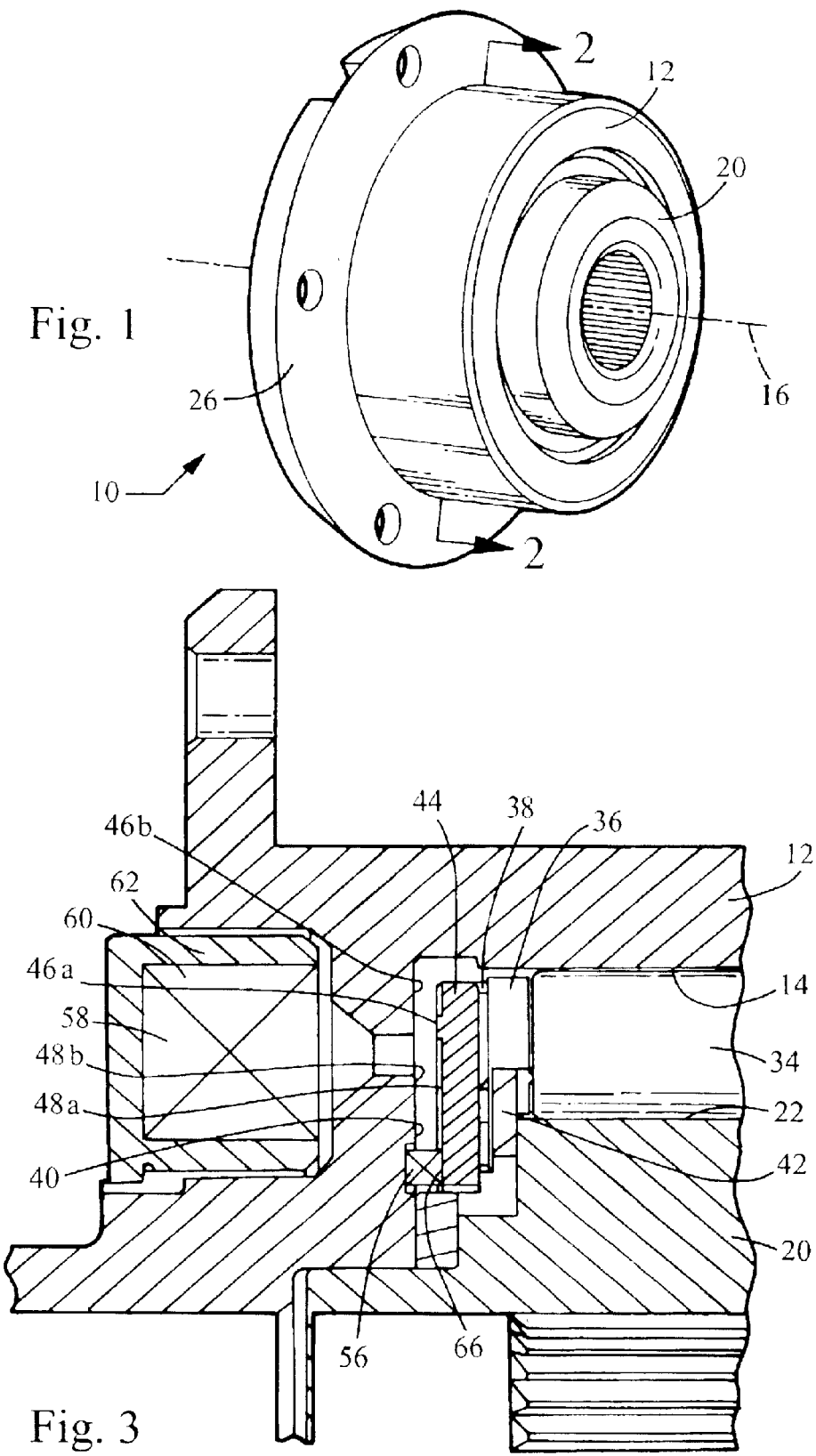
FIG. 1 is a perspective view of an over-running clutch of the present invention.
FIG. 3 is a detail of a portion of the over-running clutch of FIG. 2.
Figure 2:
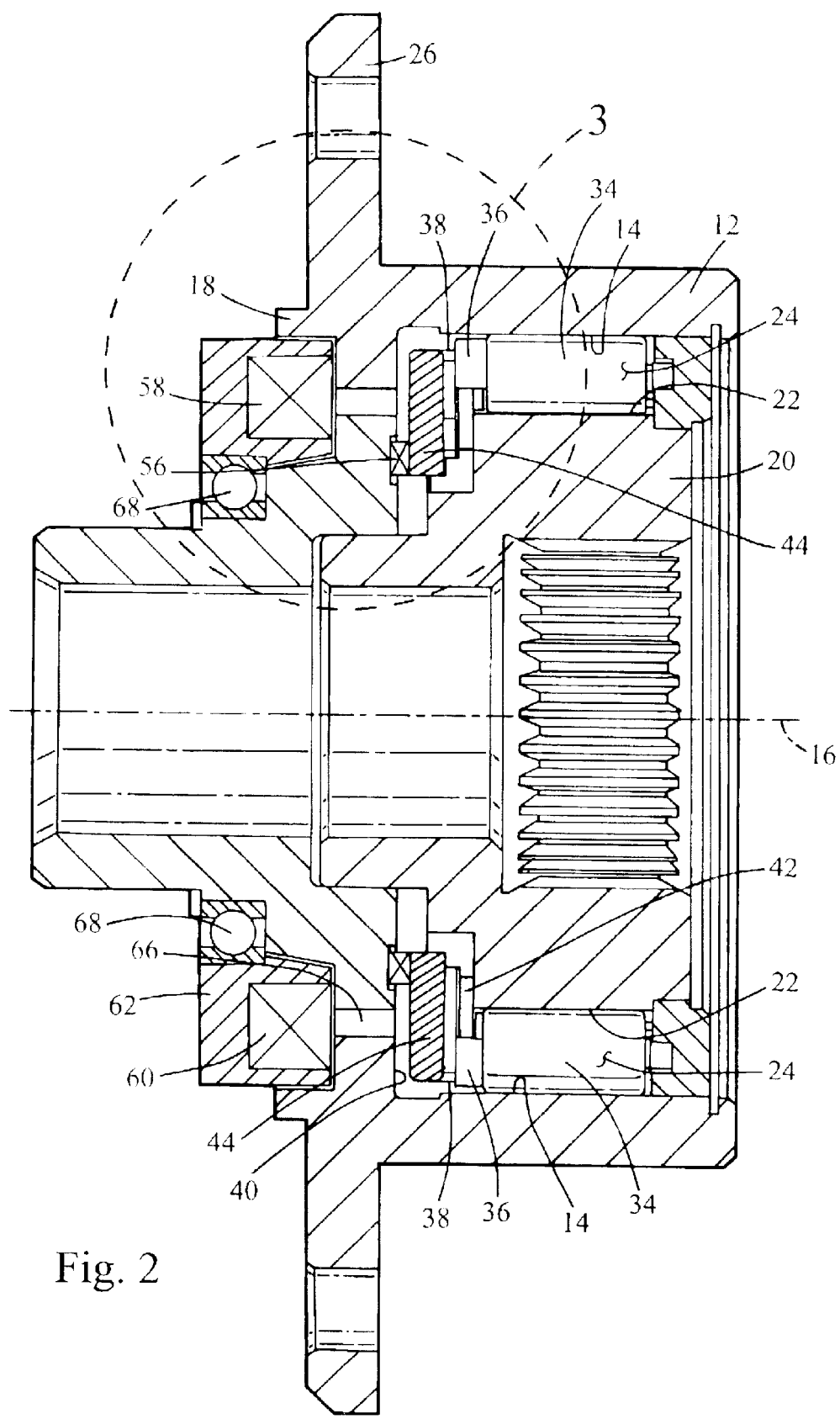
FIG. 2 is a side sectional view of the over-running clutch of FIG. 1 taken along line 2—2 of FIG. 1.

Referring to FIGS. 1 and 2, an over-running clutch assembly of the present invention is shown generally at 10. The clutch assembly 10 includes an outer race 12 having a cylindrical inner surface 14 and is rotatable about an axis 16. The outer race 12 includes a case end 18 enclosing a first end of the outer race 12. The clutch assembly 10 also includes an inner race 20 having a cammed outer surface 22 coaxial with the cylindrical inner surface 14 of the outer race 12. The inner surface 14 of the outer race 12 and the outer surface 22 of the inner race 20 define a gap 24 between the inner race 20 and the outer race 12. The inner race 20 is rotatable about the axis 16. The outer race 12 includes a flange 26 or other means for mounting the clutch assembly 10 to a differential housing 28. A plurality of rolling elements 34 are positioned within the gap 24. Preferably, the rolling elements 34, the inner race 20 and the outer race 12 are made from steel. Due to the high hertzian contact stresses experienced by the rollers 34, the inner surface 14 of the outer race 12 and the outer surface 22 of the inner race 20, and the rolling elements 34 are preferably hardened and ground.

The cammed outer surface 22 of the inner race 20 is defined by a plurality of ramp surfaces that are formed at spaced apart locations along the outer surface 22. The rolling elements 34 are positioned between the outer race 12 and the inner race 20 with one rolling element 34 being located at the center of each of the cammed surfaces of the inner race. The rolling elements 34 have a diameter which is smaller than the gap 24 between the inner surface 14 and the midpoint of the cammed outer surface 22, but greater than the gap between the outer portions of the cammed surfaces and the inner surface 14. A retainer 36 interconnects all of the rolling elements 34 and causes the rolling elements 34 to circumferentially move in unison with one another. The retainer 36 is rotatable about the axis 16 with limited relative rotation with respect to the inner race 20. The retainer 36 also includes a pair of retainer tabs 38 extending axially toward an inner surface 40 of the case end 18. A distal end of each of the retainer tabs 38 is located adjacent the inner surface 40 of the case end 18 at a distance of approximately 1 millimeter or more from the case end 18.

A first biasing element 42 is mounted onto the retainer 36 to maintain the position of the retainer 36 with respect to the inner race 20 such that the rolling elements 34 are normally held in the middle of the cammed surfaces. An actuation disk 44 is disposed between the retainer 36 and the inner surface 40 of the case end 18. The actuation disk 44 has an outer diameter and an inner diameter. The actuation disk 44 further includes a pair of notches 45 located radially about the outer diameter or the inner diameter. The notches 45 are adapted to engage the retainer tabs 38 thereby preventing rotational motion of the actuation disk 44 relative to the retainer 36, while allowing axial motion of the actuation disk 44 relative to the retainer 36. It is to be understood, that the function of the notches 45 in the actuation disk 44 and the retainer tab 38 is to rotationally link the actuation disk 44 to the retainer 36, and to allow axial movement of the actuation disk 44 relative to the retainer 36. This could be accomplished by incorporating notches within the retainer 36 and tabs on the actuation disk 44 or by other methods in addition to that presently described.

In operation, surface to surface contact between the actuation disk 44 and the inner surface 40 of the case end 18 causes surface tension between the actuation disk 44 and the inner surface 40 of the case end 18. This surface tension is caused by lubrication oil within the clutch assembly, and can cause the actuation disk 44 to stick to the inner surface 40 of the case end 18. In order to reduce the amount of surface tension between the actuation disk 44 and the inner surface 40 of the case end 18, the actuation disk 44 and the inner surface 40 of the case end 18 each include a first portion 46a, 46b and a second portion 48a, 48b.

The first portions 46a, 46b are parallel to one another and provide direct axial surface to surface contact between the actuation disk 44 and the inner surface 40 of the case end 18 as the actuation disk 44 is forced into contact with the inner surface 40 of the case end 18. This is necessary for friction between the case end 18 and the actuation disk 44. The second portions 48a, 48b define a gap between the inner surface 40 of the case end 18 and the actuation disk 44 such that no axial surface to surface contact initially occurs within the region of the second portions 48a, 48b, until the actuation disk 44 is deflected.

Figure 4:
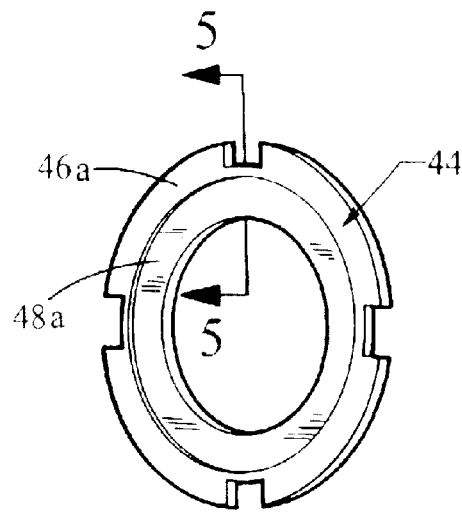
FIG. 4 is perspective view of an actuation disk of a first preferred embodiment of the clutch assembly.
Figure 5:
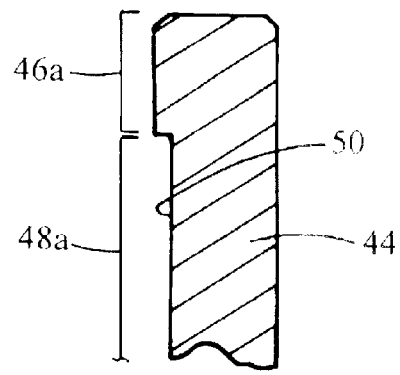
FIG. 5 is a sectional view of a the actuation disk taken along line 5—5 of FIG. 4.
Figure 6:
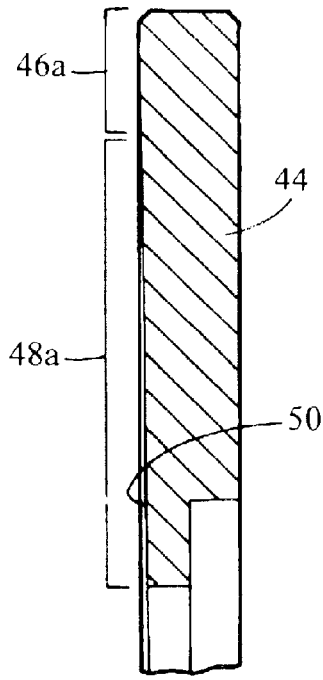
FIG. 6 is a sectional view similar to FIG. 5 of an alternative actuation disk of the first preferred embodiment.

Referring to FIGS. 3 through 6, in a first preferred embodiment, the actuation disk 44 includes an undercut region 50. The undercut region 50 provides a gap between the actuation disk 44 and the inner surface 40 of the case end 18 and defines the second portions 48a, 48b of the inner surface 40 of the case end 18 and the actuation disk 44. The undercut region 50 can be an annular notch, such as shown in FIGS. 3, 4 and 5, or the undercut region 50 can be a tapered area, such as shown in FIG. 6.

Figure 7:
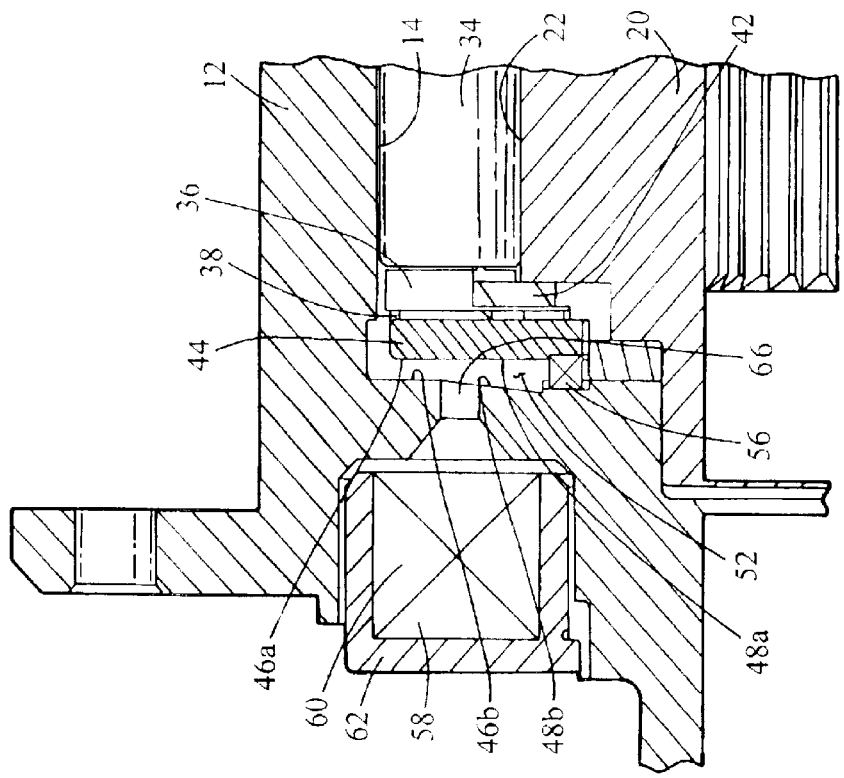
FIG. 7 is a detail view similar to FIG. 3 of a second preferred embodiment of the present invention.
Figure 8:
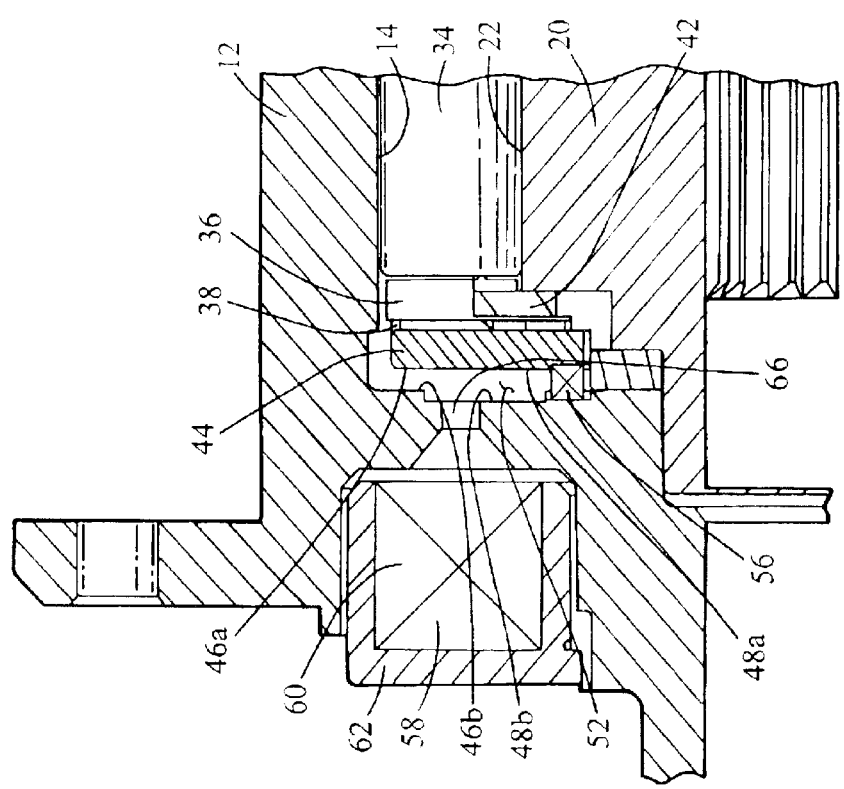
FIG. 8 is a detail view similar to FIG. 7 of an alternative to the second preferred embodiment.

Referring to FIGS. 7 and 8, in a second preferred embodiment, the inner surface 40 of the case end 18 includes an undercut region 52. The undercut region 52 provides a gap between the actuation disk 44 and the inner surface 40 of the case end 18 that defines the second portions 48a, 48b of the inner surface 40 of the case end 18 and the actuation disk 44. The undercut region 52 can be a notch, such as shown in FIG. 7, or the undercut region 52 can be a tapered area, such as shown in FIG. 8.

Figure 9:
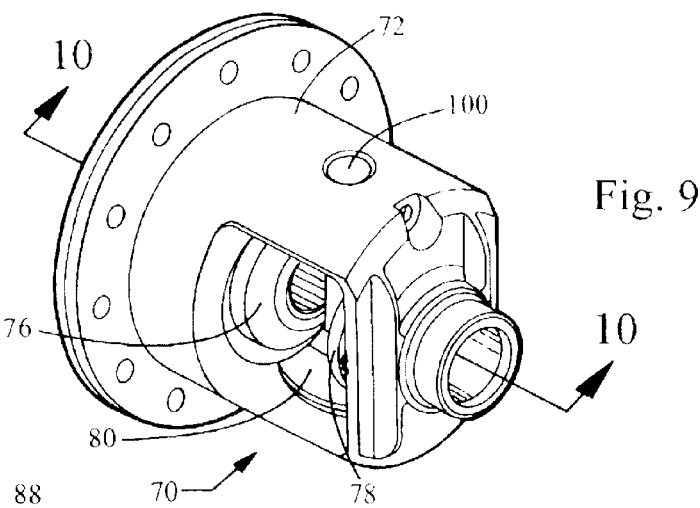
FIG. 9 is a top view of an actuation disk of a third preferred embodiment.
Figure 10:
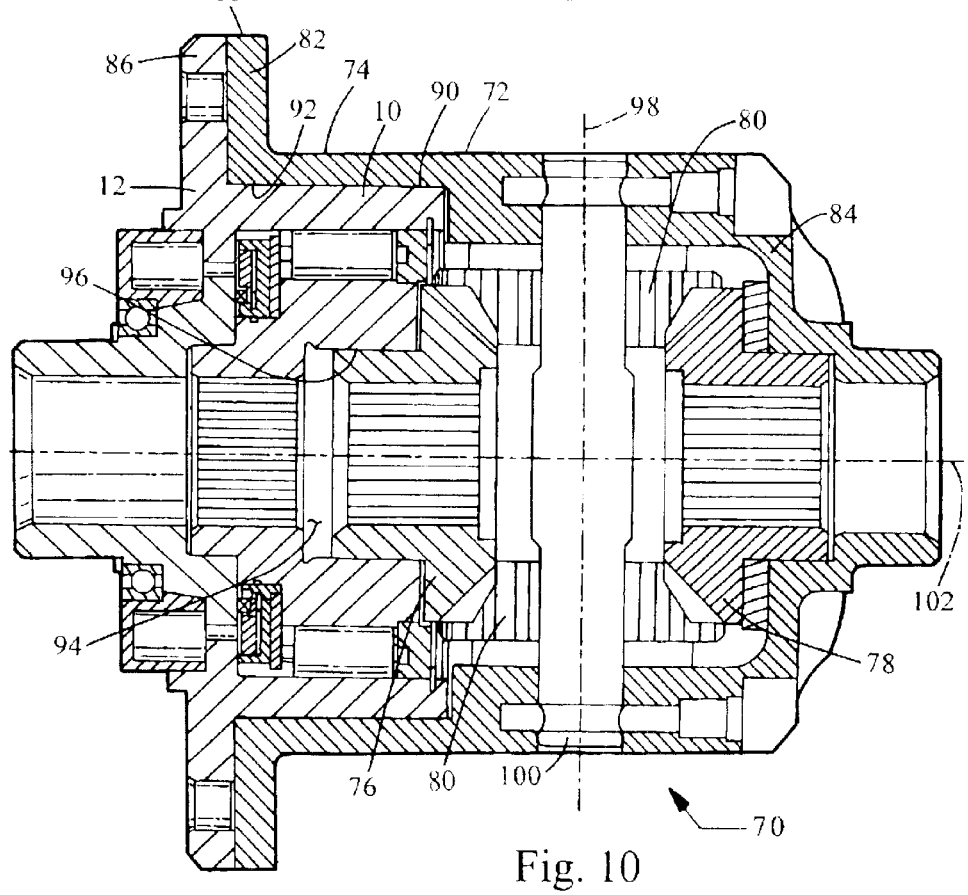
FIG. 10 is a sectional view taken along line 10—10 of FIG. 9.

Referring to FIGS. 9 and 10, in a third preferred embodiment, the actuation disk 44 includes a plurality of inserts 54. The inserts extend outward beyond an axial surface of the actuation disk 44 to define the first portions 46a of the actuation disk 44. The inserts will keep the second portions 48a of the actuation disk from initially contacting the inner surface 40 of the case end 18.

Referring again to FIG. 2, a second biasing element 56 is disposed between the actuation disk 44 and the inner surface 40 of the case end 18 to bias the actuation disk 44 away from the case end 18 and toward the retainer 36. Preferably, the second biasing element 56 is a wave spring.

Preferably, the first biasing element 42 is a centering spring supported by the inner race 20 and engaging the retainer 36 to keep the retainer 36 in position to keep the rolling elements 34 positioned at the center of the cammed surfaces of the inner race 20 thereby allowing the outer race 12 and the inner race 20 to rotate freely with respect to one other. The centering spring 42 includes a plurality of small tangs (not shown) extending radially in or out to engage small notches (not shown) on the retainer 36. The biasing force of the centering spring 42 must be carefully calibrated for the clutch assembly 10. The centering spring 42 must provide enough force to move the retainer 36 and rolling elements 34 to the neutral position easily when the clutch assembly 10 is disengaged, but not so much force that the friction between the actuation disk 44 and the case end 18 cannot overcome it to actuate the clutch assembly 10.

The clutch assembly 10 includes an actuator 58 to selectively overcome the second biasing element 56 to force the actuation disk 44 into contact with the case end 18. The actuation disk 44 is free to move axially with respect to the retainer 36, so when the attractive force of the actuator 58 overcomes the force of the second biasing element 56, the actuation disk 44 will move axially toward the inner surface 40 of the case end 18 until the first portions 46a, 46b of the actuation disk 44 and the case end 18 come into contact with one another. After the first portions 46a, 46b of the actuation disk 44 and the case end 18 have come into contact, the force of the actuator 58 can also cause the actuation disk 44 to deflect. If the force of the actuator 58 on the actuation disk 44 is sufficient such that after the actuation disk 44 has been forced toward the case end 18, such that the first portions 46a, 46b of the actuation disk 44 and the case end 18 are in contact with one another, the force of the actuator 58 can further deflect the actuation disk 44 to bring part of the second portions 48a of the actuation disk 44 into contact with the second portions 48b of the case end 18.

When at least the first portions 46a, 46b of the actuation disk 44 and the case end 18 are brought into contact with one another, the relative rotational motion of the outer race 12 and the case end 18 with respect to the actuation disk 44 will frictionally be transferred to the actuation disk 44. The actuation disk 44 is linked rotationally and circumferentially to the retainer tabs 38, therefore the rotational movement of the outer race 12 and case end 18 will be transferred through the actuation disk 44 and to the retainer 36.

Rotational movement of the retainer 36 with respect to the inner race 20 moves the rolling elements 34 along the ramped surfaces until the rolling elements 34 are no longer positioned at the centers of the cammed surfaces. Since the gap 24 is not large enough to accommodate the diameter of the rolling elements 34, when the rolling elements 34 move out of the centers of the cammed surfaces, the rolling elements 34 become wedged between the outer surface 22 of the inner race 20 and the inner surface 14 of the outer race 12, thereby locking the inner race 20 and outer race 12 together rotationally. The ramped surfaces are designed such that when the rolling elements 34 wedge between the inner and outer races 12, 20 an angle is formed between the ramped surfaces of the inner race 20 and a line tangent to the inner surface 14 of the outer race 12.

In order for the rolling elements 34 to wedge properly between the inner surface 14 of the outer race 12 and the outer surface 22 of the inner race 20, the angle defined by the ramped surfaces and a line tangent to the inner surface 14 of the outer race 12 is preferably between approximately 4 degrees and approximately 10 degrees. If this angle is too small, then the hertzian contact forces will be too high, crushing the rolling elements 34 and brinnelling the surfaces of the inner and outer races 12, 20. If the angle is too large, the rolling elements 34 will squirt out from between the inner surface 14 of the outer race 12 and the outer surface 22 of the inner race 20. The ramped surfaces and the interaction of the ramped surfaces with the rolling elements 34 are described in detail in U.S. Pat. Nos. 5,927,456 and 5,924,510 which are both assigned to NTN Corporation and are hereby incorporated by reference into this application.

Referring to FIGS. 2, 7, and 8, in the preferred embodiment, the actuator 58 comprises an electromagnetic coil 60 held within a housing 62 mounted to an interior surface of the stationary axle housing (not shown). The case end 18 includes a plurality of partially circumferential slots 66 extending through the case end 18 and spaced radially about the case end 18. When energized, the electromagnetic coil 60 produces a magnetic flux which is focused around the slots 66 and concentrated on the actuation disk 44. When the magnetic flux passes through the actuation disk 44, the actuation disk 44 is magnetically drawn toward the inner surface 40 of the case end 18. Once the magnetic force of the electromagnetic coil 60 overcomes the force of the second biasing element 56, the actuation disk 44 will start to move toward the inner surface 40 of the case end 18.

Preferably, the actuator 58 is an electromagnetic coil 60, however it is to be understood, that the present invention could be practiced with an actuator 58 of some other type. The actuation disk 44 could be moved through hydraulic or pneumatic means as well as through electromagnetic means. The present invention allows the actuator 58 to be mounted directly to the stationary axle housing in a drive line assembly, thereby allowing the differential to fit within existing axle carriers to make replacement cost efficient.

When the actuator 58 is de-energized, the magnetic attraction of the actuation disk 46 to the inner surface 40 of the case end 18 dissipates. As this attraction dissipates, the deflected portions of the actuation disk 44 will spring back, thereby leaving a gap between the actuation disk 44 and the inner surface 40 of the case end 18 within the region of the second portions 48a, 48b of the actuation disk 44 and the case end 18. Because there is no surface to surface contact between the second portions 48a, 48b of the actuation disk 44 and the case end 18, the amount of surface tension between the actuation disk 44 and the case end 18 is reduced, thereby allowing the second biasing element 56 to more easily force the actuation disk 44 away from the inner surface 40 of the case end 18.

Additionally, the spring back action of the actuation disk 44 assists the second biasing element 56 to quickly overcome the dissipating magnetic attraction and force the actuation disk 44 back away from the inner surface 40 of the case end 18, thereby separating the first portions 46a, 46b of the actuation disk 44 and the case end 18 from one another, thus eliminating the frictional transfer of rotation to the actuation disk 44.

The spring back of the deflected portions of the actuation disk 44 will reduce the amount of surface tension between the actuation disk 44 and the inner surface 40 of the case end 18, thereby allowing the second biasing element 56 to more easily force the actuation disk 44 back away from the inner surface 40 of the case end 18. In this way, the clutch assembly 10 can be dis-engaged more efficiently while still providing the full width of the actuation disk 44 to be magnetically attracted to the inner surface 40 of the case end 18 to provide frictional contact between the actuation disk 44 and the case end 18 when the actuator 58 is energized.

Without a rotational force to pull the retainer 36 and rolling elements 34 out of the neutral position, the first biasing element 42 will force the retainer 36 back into the neutral position and the rolling elements 34 back into the middle of the cammed surfaces, thereby allowing the outer race 12 to rotate freely with respect to the inner race 20, and un-locking the clutch assembly 10.

Preferably, the actuation disk 44 includes an annular step 67 extending around the inner diameter of the actuation disk 44. The annular step 67 faces the inner surface 40 of the case end 18, and provides a recess into which the second biasing element 56 is piloted and can collapse into when the actuation disk 44 is drawn to the inner surface 40 of the case end 18. Preferably, the second biasing element 56 is a wave spring that fits within the annular step 67 on the actuation disk 44 and collapses within the annular step 67 when the force of the electromagnetic coil 60 exceeds the spring force of the wave spring 56.

Preferably, the housing 62 for the electromagnetic coil 60 is mounted to the stationary axle carrier and is located with respect to the case end 18 by a bearing 68. The bearing 68 can be a ball, roller or journal bearing and will allow the electromagnetic coil 60 and the housing 62 to remain stationary with respect to the axle housing/carrier. This will allow wiring to the electromagnetic coil 60 to be simplified because an electrical connection to a rotating body is not required. Any means suitable to allow relative rotational movement between the housing 62 and the exterior surface of the case end 18 is adequate.

Figure 11:
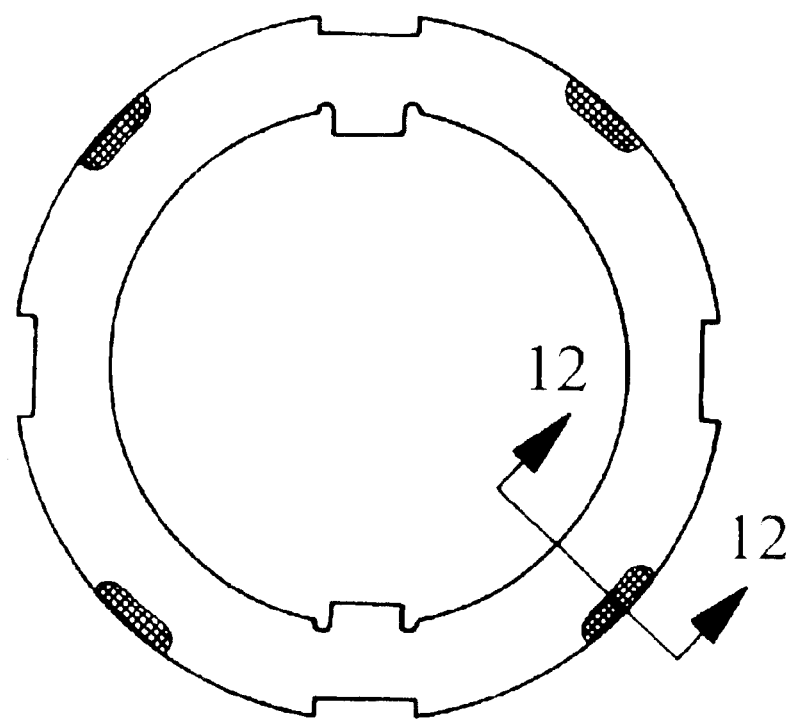
FIG. 11 is a perspective view of a differential housing with a clutch assembly of the present invention.
Figure 12:
FIG. 12 is a side sectional view taken along line 12—12 of FIG. 11.

Preferably, the clutch assembly can be used within an automotive differential to lock the two axle shafts together. Referring to FIGS. 11 & 12, a differential is shown generally at 70. The differential includes a housing 72 with an input ring gear (not shown) mounted to an outer diameter of the housing 72. Rotational motion from the drive train of the vehicle is transferred to the differential housing 72 through this ring gear. A first side gear 76 and a second side gear 78 are mounted within the differential housing 72 and are attached to first and second axle half-shafts (not shown) of the vehicle. Two or more spider gears 80 are mounted in the differential housing 72 so that they match with the first and second side gears 76, 78.

During normal straight line operation, the power provided is transmitted through the ring gear to the differential housing 72. Because there is no relative rotational speed difference between the two axles during normal straight line operation, the differential housing 72 and axles rotate at the same speed, and there is no relative motion between the side gears 76, 78 and the spider gears 80. When the vehicle turns, rotational speed differences between the two axles are caused by the differently sized circles being described by the tires on each side of the vehicle. As the axles turn at different speeds, side gears 76, 78 also turn at different speeds, but the spider gears 80 keep the two axles meshed together and torque is split proportionally between the two sides.

The clutch assembly 10 is mounted within the differential housing 72 to allow both the axles of the vehicle to be locked together by locking the first side gear 76 rotationally to the differential housing 72. Referring to FIG. 12, the second side gear 78 is rotatably mounted within the differential housing 72 at a second end 84. The second side gear 78 is fixed axially, but is allowed to rotate independently of the differential housing 72. The outer race/case end of the roller clutch 10 is fixedly mounted to the differential housing 72 at a first end 82.

As shown in FIG. 12, the clutch assembly 10 and the differential housing 72 can each include a flange 86, 88 to allow them to be attached to one another with mechanical fasteners. However, it is to be understood, that an outer diameter 90 of the outer race 12 of the clutch assembly 10 and an inner diameter 92 of the first end 82 of the differential housing 72 can be formed with splines therein and sized such that the clutch assembly 10 can be press fit within the inner diameter 92 of the first end 82 of the differential housing 72 to eliminate the need for mechanical fasteners.

The first side gear 76 is fixedly mounted to the inner race 20 of the clutch assembly 10. In the preferred embodiment, the inner race 20 includes a center bore 94 and the first side gear 76 includes an outer diameter 96, wherein the center bore 94 of the inner race 20 and the outer diameter 96 of the first side gear 76 are adapted to be press fit or splined together. The center bore 94 of the inner race 20 and the center bore of the first side gear 76 may also have splines formed on them to connect each to a common spline on the first axle/half shaft, to prevent any relative rotational movement between the inner race 20 and the first side gear 76. In all of these embodiments, the first side gear 76 and the inner race 20 are locked together and functionally act as one component.

The spider gears 80 are mounted within the housing 72 and rotate about a first axis 98 defined by a shaft 100 mounted therein. The first and second side gears 76, 78 are mounted to the differential housing and rotate about a second axis 102 defined by the first and second axle half-shafts which is perpendicular to the first axis 98. The spider gears 80 are mounted within the housing 72 and on the shaft 100 and are engaged with both the first and second side gears 76, 78.

When the clutch assembly 10 is disengaged, the inner race 20 and the outer race 12 are free to rotate relative to each other so the first side gear 76 and the first axle half shaft are free to rotate relative to the differential housing 72. If the rotational speed of the axle half-shafts are different, such as when the vehicle turns, the side gears 76, 78 also turn at different speeds, but the spider gears 80 keep the two axles meshed together and torque is split appropriately between the two sides. In conditions of poor traction (wet roads, snow, ice), one wheel can slip and the differential 70 doesn't allow the other wheel to carry any torque. Under these conditions, a vehicle can have trouble getting up even a low grade hill.

When the clutch assembly 10 is engaged, the first axle half-shaft, the first side gear 76, the inner race 20, the outer race 12 and the differential housing 72 are all locked together so that no relative rotation is allowed. When the first side gear 76 is locked rotationally to the differential housing 72, the spider gears 80, which are meshed with the first side gear 76 are prevented from rotating around the first axis 98, and the second side gear 78, which is meshed with the spider gears 80, is prevented from rotational movement relative to the differential housing 72. To simplify, when the clutch assembly 10 is engaged, the two side gears 76, 78, and consequently the two axle half-shafts are effectively locked together so that torque is transferred to both axle half-shafts equally and no relative rotation between the two axle half-shafts is allowed.

The foregoing discussion discloses and describes three preferred embodiments of the invention. One skilled in the art will readily recognize from such discussion, and from the accompanying drawings and claims, that changes and modifications can be made to the invention without departing from the fair scope of the invention as defined in the following claims. The invention has been described in an illustrative manner, and it is to be understood that the terminology which has been used is intended to be in the nature of words of description rather than of limitation.

What is claimed is:

1. An over-running clutch assembly comprising:
   an outer race having a cylindrical inner surface and being rotatable about an axis and a case end enclosing a first end of said outer race;
   an inner race having a cammed outer surface coaxial with said cylindrical inner surface and defining a gap therebetween, said inner race being rotatable about said axis with allowable rotational movement relative to said outer race;
   a plurality of ramp surfaces formed at spaced apart locations on said cammed outer surface, said ramp surfaces defining a plurality of cammed surfaces on said outer surface;
   a plurality of rollers positioned between said outer race and said inner race with each of said rollers being located in a midpoint of the cammed surfaces, said rollers having a diameter less than said gap between said cylindrical inner surface and the midpoint of said cammed outer surface;
   a retainer interconnecting all of said rollers and causing said rollers to circumferentially move in unison with one another, said retainer being rotatable about said axis with limited relative rotation with respect to said inner race, said retainer including a retainer tab extending axially toward an axial inner surface of said case end, a distal end of said retainer tab being adjacent and spaced from said inner surface of said case end;
   a first biasing element supported on said inner race to radially bias said retainer so as to hold each of said rollers onto the midpoints of the cammed surfaces;
   an actuation disk having an outer diameter, an inner diameter and a thickness, disposed between said retainer and said inner surface of said case end including a notch located radially about said outer diameter of said actuation disk, said notch adapted to engage said retainer tab thereby preventing rotational motion of the actuation disk relative to the retainer and allowing axial motion of the actuation disk relative to the retainer;
   a second biasing element disposed between said actuation disk and said inner surface of said case end to bias said actuation disk away from said case end and toward said retainer; and
   an actuator to selectively overcome said second biasing element to force said actuation disk into contact with said case end, wherein rotation of said outer race and case end with respect to said inner race is frictionally transferred to said actuation disk and said retainer, thereby moving said rollers along said ramp surfaces to a position where said rollers engage and wedge between said inner and outer races to prevent relative rotation between said inner and outer races;
   said actuation disk adapted to deflect when forced against said case end such that said actuation disk and said case end each includes a first portion adapted to provide surface to surface contact between said actuation disk and said case end as said actuation disk is forced toward said case end, and a second portion adapted to provide surface to surface contact between said actuation disk and said case end only after said actuation disk has been forced into contact with said case end and deflects under the applied force.

2. The over-running clutch assembly of claim 1 wherein said actuation disk includes a plurality of inserts, said inserts extending outward beyond an axial surface of said actuation disk such that said first portion is defined by said inserts and portions of said case end aligned with said inserts.

3. The over-running clutch assembly of claim 1 wherein said first biasing element is a centering spring held in place between said inner race and said retainer to bias said retainer into a neutral position wherein the rollers are held at said midpoint of said cammed surfaces on said inner race.

4. The over-running clutch assembly of claim 1 wherein said actuation disk further includes a recess on an axial face of one of said actuation disk and said case end, and said second biasing element is a wave spring resting within said recess, said recess providing a cavity into which said wave spring compresses when said actuation disk is forced into contact with said inner surface of said case end.

5. The over-running clutch assembly of claim 1 wherein said actuator comprises an electromagnetic coil held within a housing mounted to a stationary housing and being located relative to said case and, said case end including slots spaced radially about said case end, wherein a magnetic flux is focused around said slots to said actuation disk when said electromagnetic coil is energized, thereby magnetically attracting said actuation disk toward said inner surface of said case end.

6. The over-running clutch assembly of claim 5 wherein said housing for said electromagnetic coil is located relative to said case end by a bearing to allow said case end and said outer race to rotate independently of said housing.

7. The over-running clutch assembly of claim 1 wherein one of said actuation disk and said case end includes a relief area extending annularly thereabout, said second portion of said actuation disk and said case end being defined by regions of said actuation disk and said case end that are aligned with said relief area.

8. The over-running clutch assembly of claim 7 wherein said relief area is defined by an annular notch formed within one of said actuation disk and said case end.

9. The over-running clutch assembly of claim 7 wherein said relief area is defined by an annular tapered section formed within one of said actuation disk and said case end.

10. The over-running clutch assembly of claim 9 wherein said tapered section is formed within said actuation disk and tapers from said first portion away from said case end.

11. The over-running clutch assembly of claim 9 wherein said tapered section is formed within said case end and tapers from said first portion away from said actuation disk.

12. A driveline assembly comprising:
a first axle half-shaft and a second axle half-shaft;
an axle housing;
a differential housing rotatably mounted within said axle housing;
a least two spider gears rotatable about a first axis and mounted to said differential housing for rotation therewith;
a first side gear being fixedly coupled to said first axle half-shaft and a second side gear being fixedly coupled to said second axle half-shaft;
a clutch assembly coupled to said differential housing and one of said axle half-shafts, said clutch assembly including an outer race having a cylindrical inner surface and being rotatable about an axis and a case end enclosing a first end of said outer race; an inner race having a cammed outer surface coaxial with said cylindrical inner surface and defining a gap therebetween, said inner race being rotatable about said axis with allowable rotational movement relative to said outer race; a plurality of ramp surfaces formed at spaced apart locations on said cammed outer surface, said ramp surfaces defining a plurality of cammed surfaces on said outer surface; a plurality of rollers positioned between said outer race and said inner race with each of said rollers being located in a midpoint of the cammed surfaces, said rollers having a diameter less than said gap between said cylindrical inner surface and the midpoint of said cammed outer surface; a retainer interconnecting all of said rollers and causing said rollers to circumferentially move in unison with one another, said retainer being rotatable about said axis with limited relative rotation with respect to said inner race, said retainer including a retainer tab extending axially toward an axial inner surface of said case and, a distal end of said retainer tab being adjacent said inner surface of said case end; a first biasing element supported on said retainer to radially bias said retainer so as to hold each of said rollers onto the midpoints of the cammed surfaces; an actuation disk having an outer diameter, an inner diameter and a thickness, disposed between said retainer and said inner surface of said case end including a notch located radially about said outer diameter of said actuation disk, said notch adapted to engage said retainer tab thereby preventing rotational motion of the actuation disk relative to the retainer and allowing axial motion of the actuation disk relative to the retainer; a second biasing element disposed between said actuation disk and said inner surface of said case end to bias said actuation disk away from said case end and toward said retainer; and an actuator to selectively overcome said second biasing element to force said actuation disk into contact with said case end, wherein rotation of said outer race and case end with respect to said inner race is frictionally transferred to said actuation disk and said retainer, thereby moving said rollers along said ramp surfaces to a position where said rollers engage and wedge between said inner and outer races to prevent relative rotation between said inner and outer races, thereby locking both of said axle half-shafts together rotationally and transferring torque through said differential housing to both of said axles half-shafts; said actuation disk and said case end each including a first portion adapted to provide axial surface to surface contact between said actuation disk and said case end when said actuation disk is forced toward said case end and a second portion adapted to provide surface to surface contact only after said actuation disk deflects under the force of said actuator.

13. The driveline assembly of claim 12, wherein said first axis is established by a shaft mounted within said housing, said spider gears being rotatably mounted to said shaft.

14. The driveline assembly of claim 12, wherein said first side gear is idly connected to said inner race, thereby fixedly connecting said first axle half-shaft to said inner race, and said second side gear is rotatably supported by said housing, thereby rotatably supporting said second axle half-shaft with said housing.

15. The driveline assembly of claim 12, wherein said inner race is fixedly connected to said first side gear, and said second side gear is rotatably supported by said housing, thereby rotatably supporting said second axle half-shaft with said housing.

16. The driveline assembly of claim 12 wherein said actuation disk includes a plurality of inserts, said inserts extending outward beyond an axial surface of said actuation disk such that said first portion is defined by said inserts and portions of said case end aligned with said inserts.

17. The driveline assembly of claim 12 wherein said first biasing element is a centering spring held in place between said inner race and said retainer to bias said retainer into a neutral position wherein the rollers are held at said midpoints of said cammed surfaces.

18. The driveline assembly of claim 12 wherein said actuation disk further includes a recess formed on an axial face of said actuation disk and said second biasing element is a wave spring resting within said recess, said recess providing a cavity into which said wave spring compresses when said actuation disk is forced into contact with said inner surface of said case end.

19. The driveline assembly of claim 12, wherein said actuator comprises an electromagnetic coil held within a housing mounted to an interior surface of said axle housing and is located with respect to said case end by a bearing therebetween, said case end including slots spaced radially about said case end, wherein a magnetic flux is focused around said slots to said actuation disk when said electromagnetic coil is energized, thereby magnetically attracting said actuation disk toward said inner surface of said case end.

20. The driveline assembly of claim 19 wherein said housing for said electromagnetic coil is supported on said case end by a bearing to allow said case end and outer race to rotate independently of said housing.

21. The driveline assembly of claim 12 wherein one of said actuation disk and said case end includes a relief area extending annularly thereabout, said second portion of said actuation disk and said case end being defined by regions of said actuation disk and said case end that are aligned with said relief area.

22. The driveline assembly of claim 21 wherein said relief area is defined by an annular notch formed within one of said actuation disk and said case and of said clutch assembly.

23. The driveline assembly of claim 21 wherein said relief area is defined by an annular tapered section formed within one of said actuation disk and said case end of said clutch assembly.

24. The driveline assembly of claim 23 wherein said tapered section is formed within said actuation disk and tapers from said first portion away from said case end.

25. The driveline assembly of claim 23 wherein said tapered section is formed within said case end and tapers from said first portion away from said actuation disk.

* * * * *

UNITED STATES PATENT AND TRADEMARK OFFICE
CERTIFICATE OF CORRECTION

PATENT NO. : 6,790,153 B2 Page 1 of 1
APPLICATION NO. : 10/309830
DATED : September 14, 2004
INVENTOR(S) : Shiro Goto It is certified that error appears in the above-identified patent and that said Letters Patent is hereby corrected as shown below:

<u>In the Claims</u>

Col. 10, in claim 5, line 4, after "said case" delete "and," and substitute --end,-- in its place.

Col. 11, in claim 12, line 35, after "said case" delete "and," and substitute --end,-- in its place.

Col. 12, in claim 14, line 2, after "gear is" delete "idly" and substitute --fixedly-- in its place.

Col. 12, in claim 22, line 3, after "said case" delete "and" and substitute --end-- in its place.

Signed and Sealed this

Seventeenth Day of April, 2007

JON W. DUDAS
*Director of the United States Patent and Trademark Office*